(12) United States Patent
Feng

(10) Patent No.: US 11,747,016 B2
(45) Date of Patent: Sep. 5, 2023

(54) ALL-PURPOSE GAS STOVE STRUCTURE CAPABLE OF INCREASING AIR INTAKE THEREOF

(71) Applicant: Fu-Du Feng, Taipei (TW)

(72) Inventor: Fu-Du Feng, Taipei (TW)

( * ) Notice: Subject to any disclaimer, the term of this patent is extended or adjusted under 35 U.S.C. 154(b) by 54 days.

(21) Appl. No.: 17/340,214

(22) Filed: Jun. 7, 2021

(65) Prior Publication Data

US 2022/0390103 A1    Dec. 8, 2022

(51) Int. Cl.
| | | |
|---|---|---|
| F23N 1/00 | (2006.01) | |
| F23Q 3/00 | (2006.01) | |
| F24C 15/00 | (2006.01) | |
| A47J 37/07 | (2006.01) | |
| A47J 36/32 | (2006.01) | |
| F24C 3/12 | (2006.01) | |

(52) U.S. Cl.
CPC ............... *F23N 1/007* (2013.01); *A47J 36/32* (2013.01); *A47J 37/0713* (2013.01); *F23Q 3/00* (2013.01); *F24C 3/126* (2013.01); *F24C 15/007* (2013.01); *A47J 2202/00* (2013.01); *F23N 2237/10* (2020.01)

(58) Field of Classification Search
CPC .......... F23C 3/126; F24C 15/007; F23Q 3/00; F23N 1/007; A47J 37/0713; A47J 36/32
USPC ................................................ 126/39 R, 25 R
See application file for complete search history.

(56) References Cited

U.S. PATENT DOCUMENTS

2010/0206293 A1* 8/2010 Padgett .................. F23D 14/06
431/258
2016/0255998 A1* 9/2016 Feng ....................... F24C 3/022

* cited by examiner

*Primary Examiner* — Vivek K Shirsat
(74) *Attorney, Agent, or Firm* — Juan Carlos A. Marquez; Marquez IP Law Office, PLLC

(57) ABSTRACT

An all-purpose gas stove structure capable of increasing its air intake includes an all-purpose opening-covering case, an extended supporting frame, and at least one gas nozzle. The all-purpose opening-covering case includes an opening-covering case body for covering the heat source-receiving opening of a roasting/grilling device completely, and a gas controller with a gas operation unit for controlling the state of communication between gas input and output ends. The extended supporting frame is a box with a protective lid, is coupled to the inner side of the opening-covering case body at one end, and has a stove burner opening at the opposite end. The lateral walls of the protective lid are formed with vent holes. The gas nozzle is provided on the inner side of the stove burner opening. The all-purpose gas stove structure allows a ceramic roasting/grilling device to have a higher air intake and therefore produce higher heat.

5 Claims, 7 Drawing Sheets

ALL-PURPOSE GAS STOVE STRUCTURE CAPABLE OF INCREASING AIR INTAKE THEREOF

BACKGROUND OF THE INVENTION

1. Technical Field

The present invention relates to an all-purpose gas stove structure capable increasing its air intake. More particularly, the invention relates to an all-purpose gas stove structure that can increase its air intake and be applied to a ceramic roasting/grilling device for use in outdoor family barbecues.

2. Description of Related Art

For the sake of environmental protection, and in order to prevent the inconvenience of cleaning, as well as pollution, associated with the use of charcoal, the market has been supplied with ceramic roasting/grilling devices that use a gas stove as the heat source. However, the existing gas stoves for use with ceramic roasting/grilling devices do not generate sufficient heat and cannot be used interchangeably between ceramic roasting/grilling devices of different brands. The lack of compatibility with differently branded ceramic roasting/grilling devices results from the fact that each gas stove is designed in accordance with the specifications of the ceramic roasting/grilling devices produced by the manufacturer of the gas stove themselves, and that the specifications of ceramic roasting/grilling devices vary from one manufacturer to another. The manufacturer-specific designs of such gas stoves make it difficult to obtain an affordable gas stove replacement conveniently when an existing gas stove needs to be replaced or upgraded. It is therefore important to design a gas stove that has advantages over its prior art counterparts in terms of roasting/grilling heat, compatibility, and cost.

BRIEF SUMMARY OF THE INVENTION

The inventor of the present invention aimed to design an all-purpose gas stove structure capable of increasing its air intake, or more particularly a gas stove structure that not only can be applied to roasting/grilling devices of different brands, but also can produce significantly more heat, and thus enable more efficient roasting and grilling, than conventionally achievable.

The present invention provides an all-purpose gas stove structure capable of increasing its air intake. The all-purpose gas stove structure includes an all-purpose opening-covering case, an extended supporting frame, and at least one gas nozzle. The all-purpose opening-covering case includes an opening-covering case body for covering the heat source-receiving opening of a roasting/grilling device completely, and a gas controller provided in the opening-covering case body. The gas controller has a gas input end jutting out from the opening-covering case body, at least one gas output end, and a gas operation unit. The gas operation unit has an operation end provided on the opening-covering case body and configured to control the state of communication between the gas input end and the at least one gas output end. The extended supporting frame is a box with a protective lid, and the lateral walls of the protective lid are formed with a plurality of vent holes. One end of the extended supporting frame is coupled to the inner side of the opening-covering case body, and the opposite end of the extended supporting frame is provided with a stove burner opening. The at least one gas nozzle is provided on the inner side of the stove burner opening and is in communication with the at least one gas output end.

Implementation of the present invention can produce at least the following advantageous effects:
1. The invention enables a gas stove to be compatible with ceramic roasting/grilling devices of different brands.
2. Compared with the prior art, the gas stove structure of the invention can provide more effective heating to increase roasting and grilling efficiency.

BRIEF DESCRIPTION OF THE SEVERAL VIEWS OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1A:
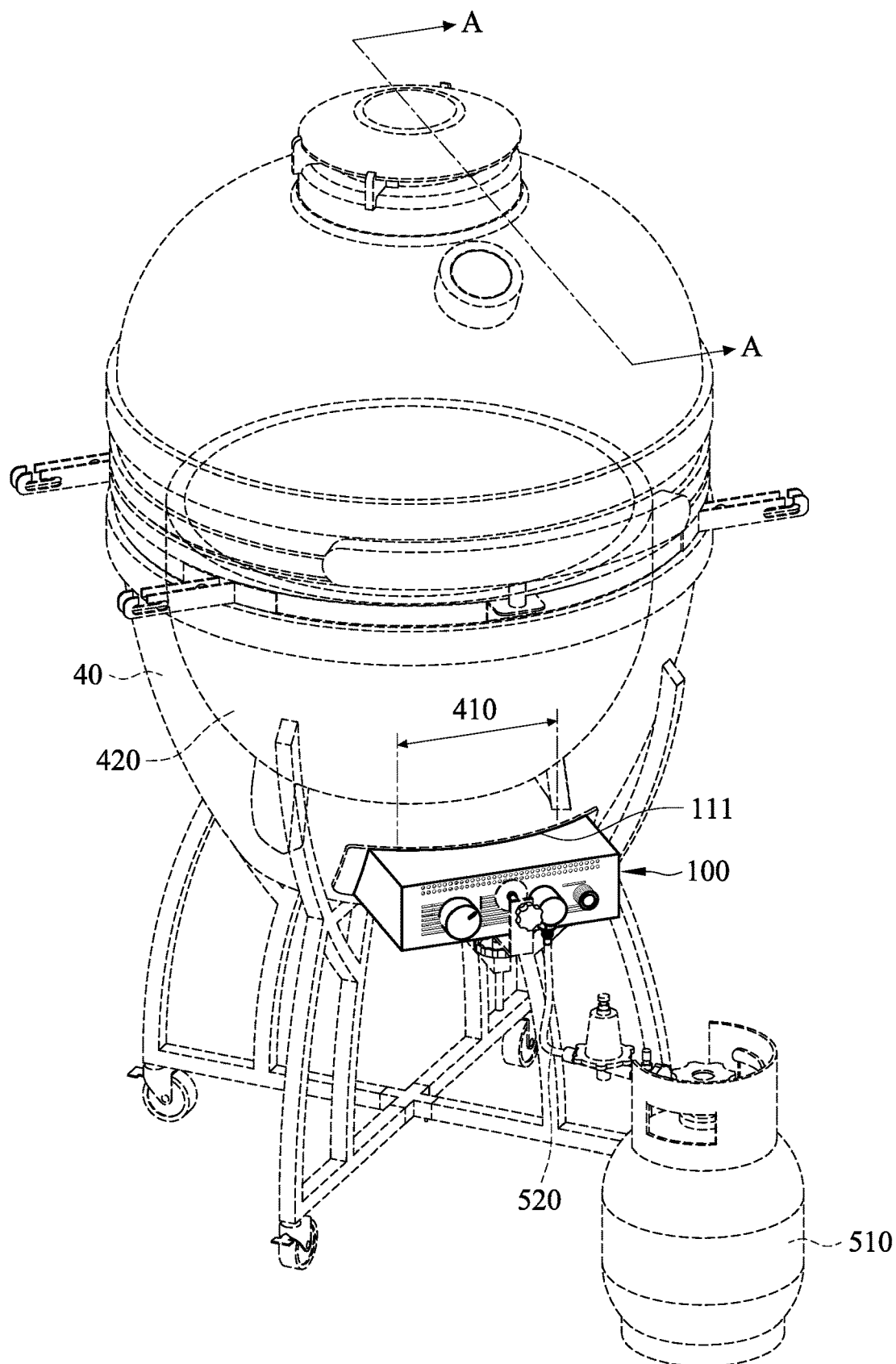
FIG. 1A shows how the all-purpose gas stove structure according to an embodiment of the present invention is applied to a roasting/grilling device.
Figure 1B:
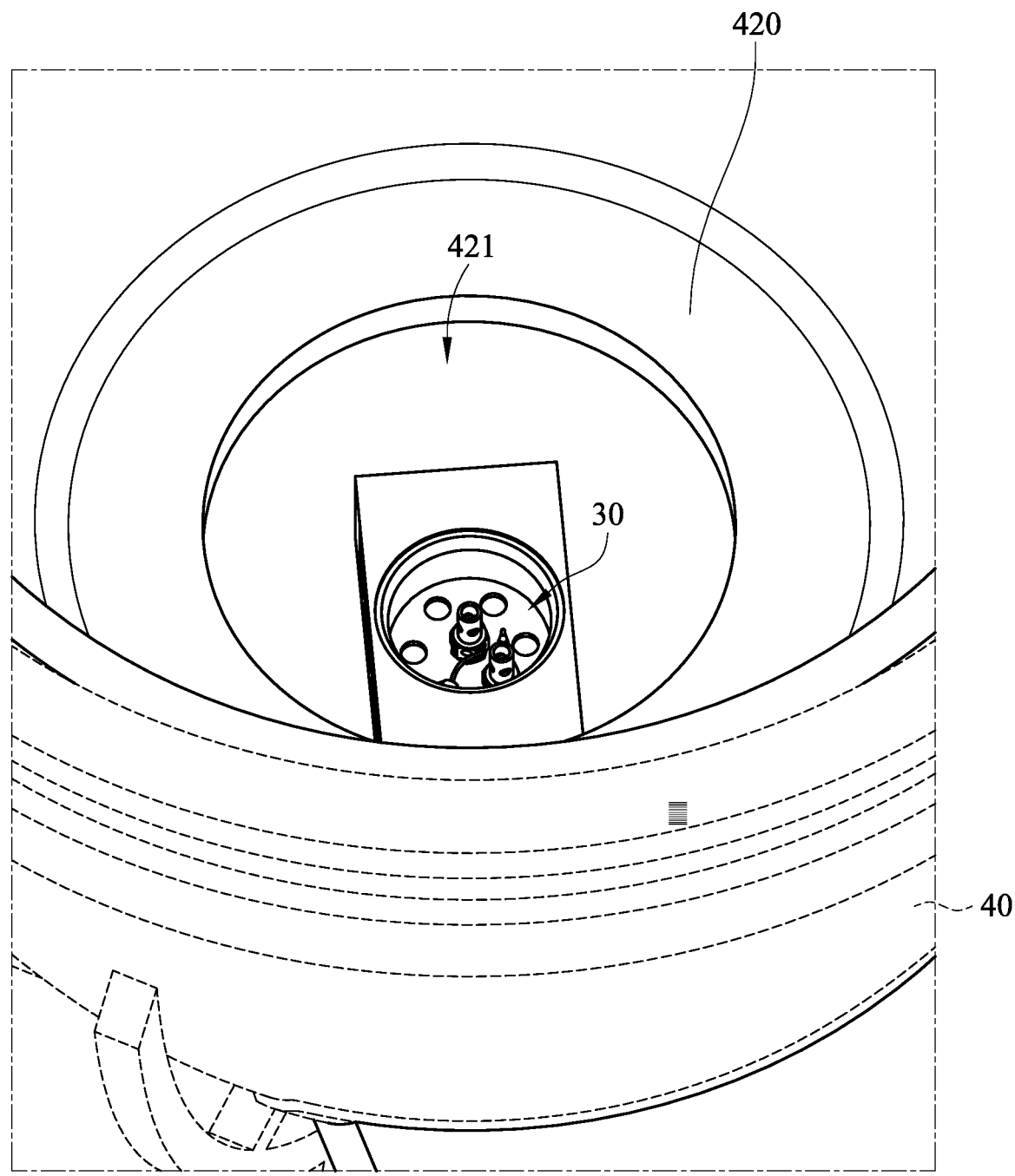
FIG. 1B is a top view of an internal portion of the all-purpose gas stove structure in FIG. 1A.
Figure 2A:
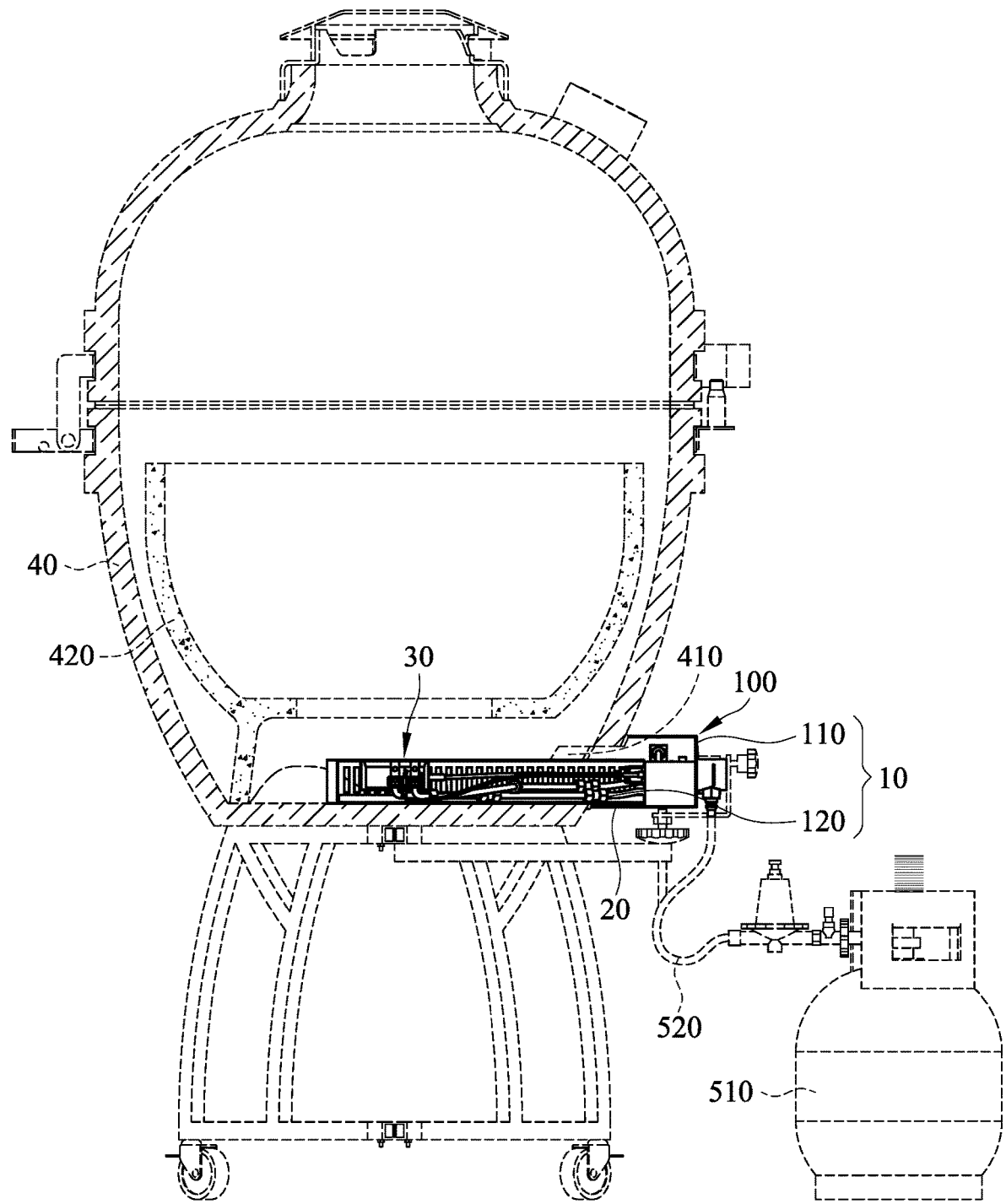
FIG. 2A is a sectional view taken along line A-A in FIG. 1A.
Figure 2B:
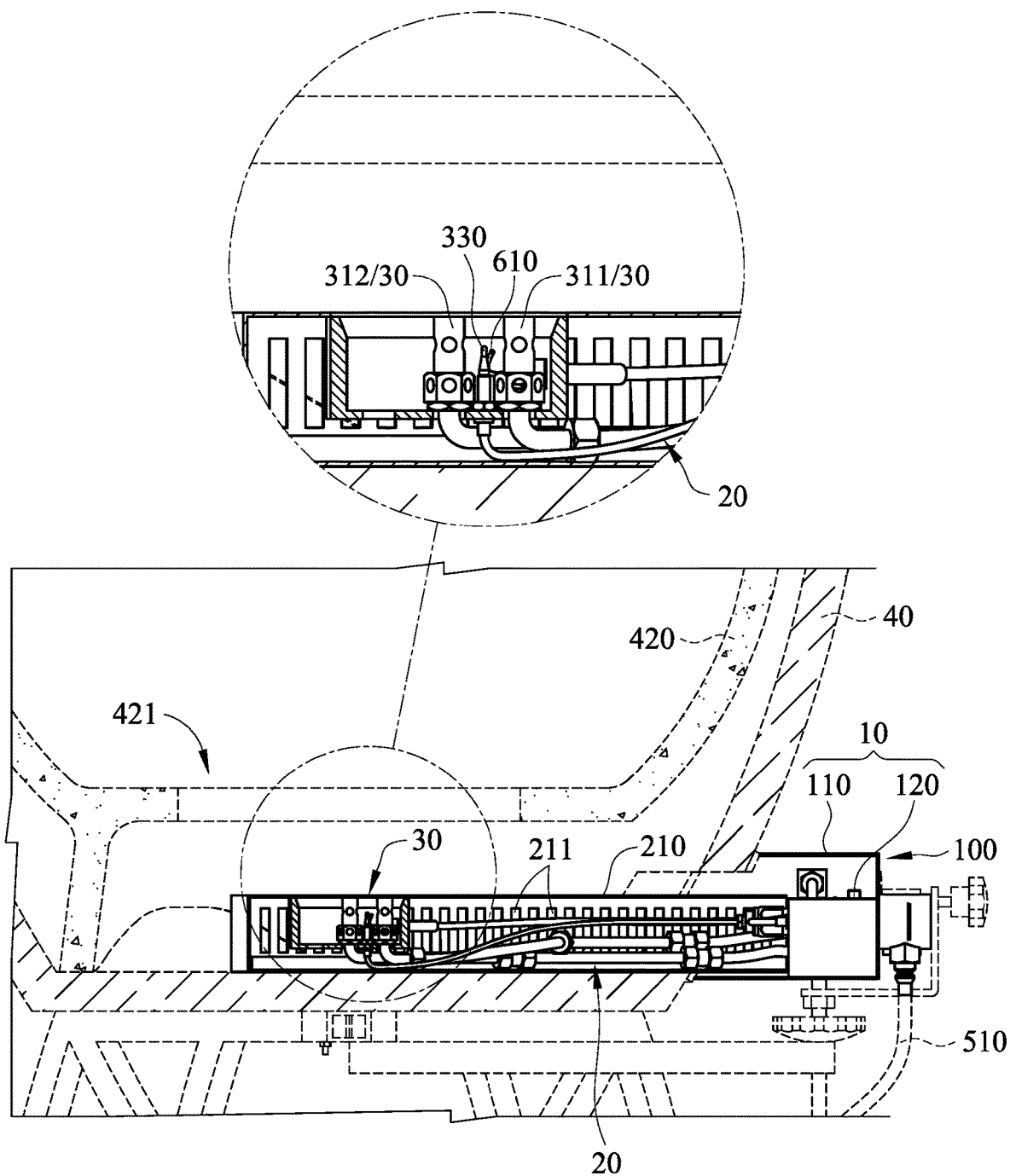
FIG. 2B is a partial enlarged view of FIG. 2A.

Referring to FIG. 1A to FIG. 5, the all-purpose gas stove structure 100 capable of increasing its air intake according to an embodiment of the present invention is applied to a ceramic roasting/grilling device 40 and includes an all-purpose opening-covering case 10, an extended supporting frame 20, and at least one gas nozzle 30. The all-purpose opening-covering case 10 includes an opening-covering case body 110 and a gas controller 120. The all-purpose opening-covering case 10 is configured to be coupled to a lower opening 421 of an inner bowl 420 of the ceramic roasting/grilling device 40.

The opening-covering case body 110 has a first width D1 adapted to cover, and capable of completely covering, the width 410 of the heat source-receiving opening of each of a plurality of roasting/grilling devices 40 of different brands. In order to attach to the roasting/grilling device 40 compliantly and tightly, one side of the opening-covering case body 110 may be a curved structure 111 that matches the contour of the roasting/grilling device 40.

The extended supporting frame 20 is a box with a protective lid 210. The lateral walls of the protective lid 210 are formed with a plurality of vent holes 211 that are arranged like the gill slits of a shark to increase the intake of oxygen during combustion. One end of the extended supporting frame 20 is coupled to the inner side of the opening-covering case body 110, and the opposite end of the extended supporting frame 20 is provided with a stove burner opening 220.

The extended supporting frame 20 allows the at least one gas nozzle 30 to extend effectively to a central portion of the roasting/grilling device 40, and in order to adapt to the widths 410 of the heat source-receiving openings of a plurality of roasting/grilling devices 40 of different brands, the extended supporting frame 20 has a second width D2 less than the width 410 of the heat source-receiving opening of each roasting/grilling device 40 on the market so that the extended supporting frame 20 can be inserted into each roasting/grilling device 40 on the market, thereby enabling universal use of the at least one gas nozzle 30.

In more practical terms, the ratio or relationship between the first width D1 of the opening-covering case body 110 and the second width D2 of the extended supporting frame 20 is as follows: the first width D1 is greater than or equal to the second width D2 (i.e., D1≥D2), or the first width D2 is greater than or equal to N times the second width D2, with N being greater than or equal to 1.2 (i.e., D1≥ND2, where N≥1.2). In addition, as stated above, the extended supporting frame 20 has the protective lid 210.

Figure 3:
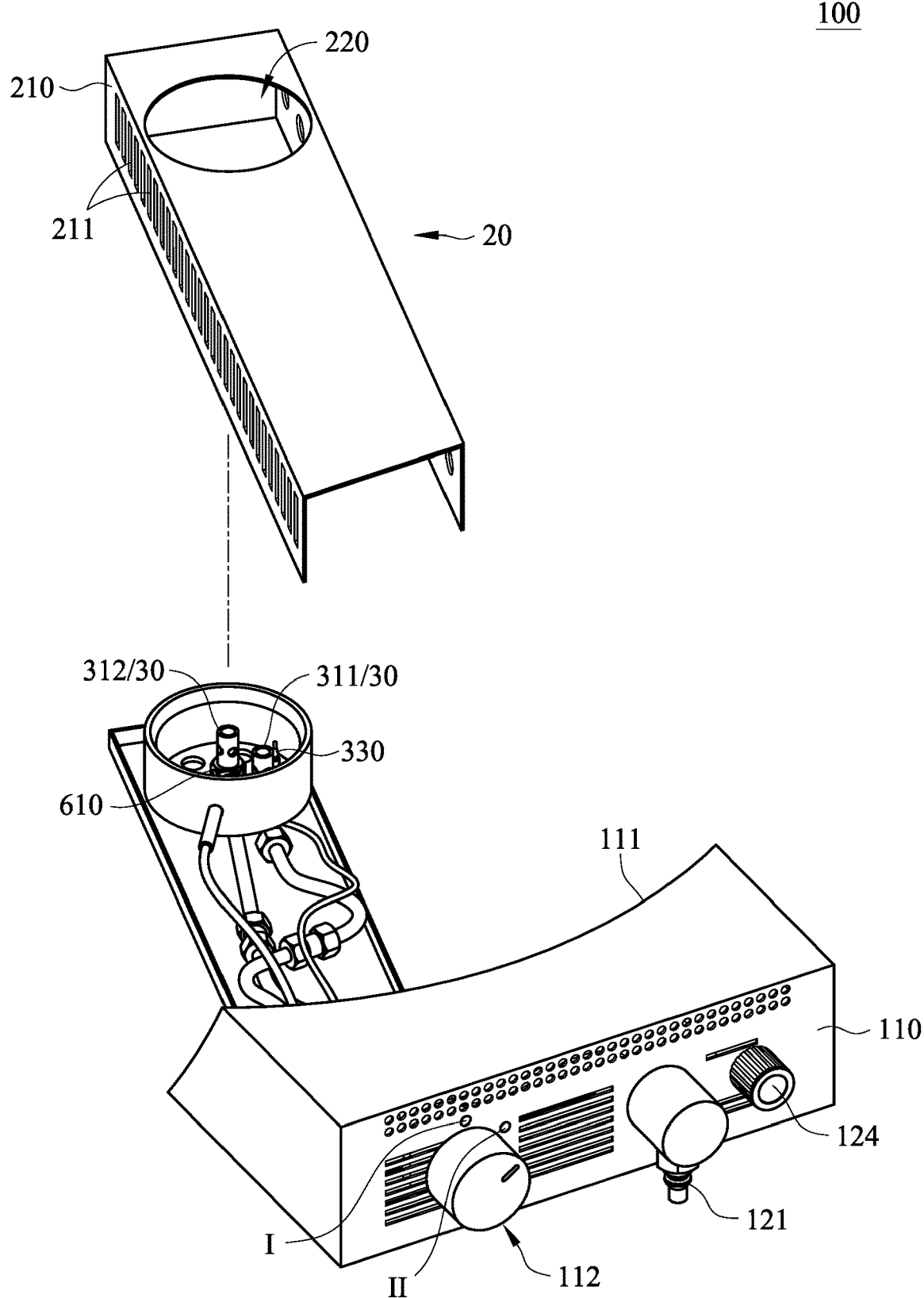
FIG. 3 is a partially exploded perspective view of the all-purpose gas stove structure in FIG. 1A.
Figure 4:
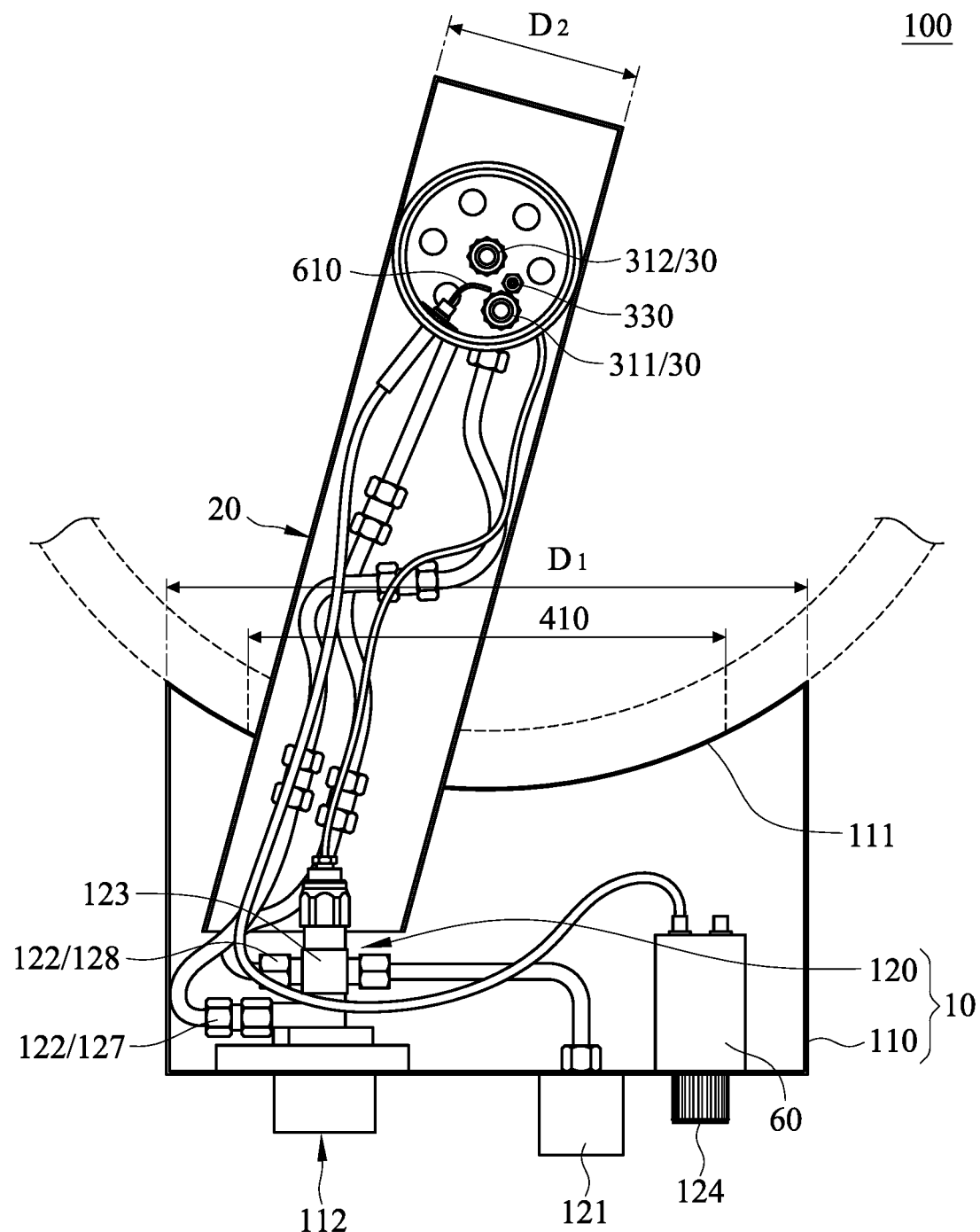
FIG. 4 is a top sectional view of the all-purpose gas stove structure in FIG. 1A.
Figure 5:
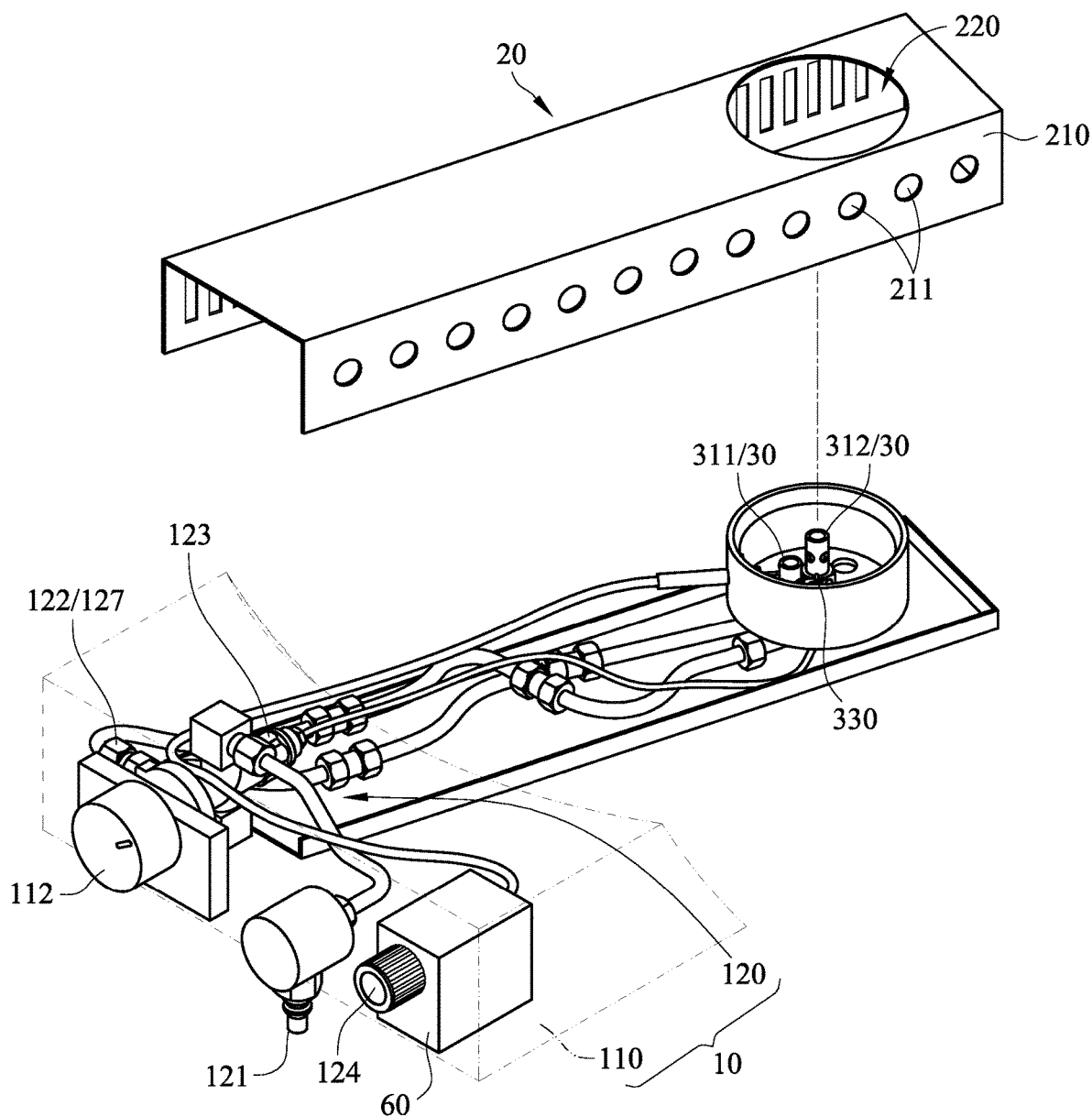
FIG. 5 shows how a gas controller is arranged in the all-purpose gas stove structure in FIG. 1A.

As shown in FIG. 3 to FIG. 5, the gas controller 120 is provided in the opening-covering case body 110 in a protected manner. The gas controller 120 at least has a gas input end 121, at least one gas output end 122, and a gas operation unit 112. The gas input end 121 extends out of the housing of the opening-covering case body 110 so as to be easily connected to an external gas cylinder 510 through a gas hose 520.

The gas operation unit 112 has an operation end provided on the opening-covering case body 110. The gas operation unit 112 can be used to control the state of communication between the gas input end 121 and the at least one gas output end 122. For example, communication between the gas input end 121 and the at least one gas output end 122 is cut off when the gas operation unit 112 is rotated counterclockwise to the fullest; the gas input end 121 is brought into communication with a low-heat gas output end 127 of the at least one gas output end 122 when the gas operation unit 112 is rotated clockwise to a first turned-on stage I; and the gas input end 121 is gradually brought into communication with a high-heat gas output end 128 of the at least one gas output end 122 when the gas operation unit 112 is further rotated clockwise to a second turned-on stage II.

To control the heating temperature effectively, the gas operation unit 112 may include a low-heat control section I and a high-heat control section II for controlling the amount of gas output from the low-heat gas output end 122/127 and the high-heat gas output end 122/128 of the gas controller 120 to a low-heat gas nozzle 30/311 of the at least one gas nozzle 30 and a high-heat gas nozzle 30/312 of the at least one gas nozzle 30 respectively. To facilitate ignition at the at least one gas nozzle 30, the gas operation unit 112 may work in conjunction with an automatic ignition switch 124 in order to ignite the output gas, wherein the automatic ignition switch 124 may be provided on the opening-covering case body 110.

When the gas operation unit 112 is in the first turned-on stage I, the low-heat gas output end 127 is opened to allow a relatively small amount of gas to be delivered to the low-heat gas nozzle 311. In the meantime, the automatic ignition switch 124 can be operated to activate an automatic igniter 60, in order for an electronic ignition element 610 at the output end of the automatic igniter 60 to generate an electric arc at the gas nozzle 30 (i.e., the low-heat gas nozzle 311), thereby igniting the gas output from the low-heat gas nozzle 311. When the gas operation unit 112 is in the second turned-on stage II, the high-heat gas output end 128 is opened to allow gas to be delivered to the high-heat gas nozzle 30/312, and the gas output from the high-heat gas nozzle 30/312 will be ignited by the flame at the low-heat gas nozzle 30/311.

The at least one gas nozzle 30 is provided on the inner side of the stove burner opening 220 and is in communication with the at least one gas output end 122. The at least one gas nozzle 30 is provided below the opening 421 of the inner bowl 420 in order for the flame at the at least one gas nozzle 30 to extend upward and enter the inner bowl 420 effectively.

Considering the safety of use, the gas controller 120 may further have a safety control valve 123 that receives a heat level signal from a heat sensor 330 provided near the at least one gas nozzle 30. When the heat level signal is lower than a predetermined temperature value, i.e., when the at least one gas nozzle 30 is detected to have no combustion temperature, the safety control valve 123 will cut off gas output from the at least one gas output end 122 to ensure safe use.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. An all-purpose gas stove structure capable of increasing an air intake thereof, comprising:
    an all-purpose opening-covering case comprising:
    an opening-covering case body for covering a heat source-receiving opening of a roasting/grilling device completely; and
    a gas controller provided in the opening-covering case body, the gas controller having:
    a gas input end extending out of the opening-covering case body;
    at least one gas output end; and
    a gas operation unit, wherein the gas operation unit has an operation end provided on the opening-covering case body and configured to control a state of communication between the gas input end and the at least one gas output end;
    an extended supporting frame formed as a box and provided with a protective lid, wherein the protective lid has lateral walls formed with a plurality of vent holes, and the extended supporting frame has one end coupled to an inner side of the opening-covering case body and an opposite end provided with a stove burner opening; and
    at least one gas nozzle provided on an inner side of the stove burner opening and being in communication with the at least one gas output end;
    wherein the opening-covering case body has a first width, the extended supporting frame has a second width, and the first width is N times the second width, with N being greater than or equal to 1.2 so as to accommodate a plurality of gas operation unit types.

2. The all-purpose gas stove structure of claim 1, wherein the opening-covering case body has one side formed as a curved structure.

3. The all-purpose gas stove structure of claim 1, wherein the gas operation unit comprises a low-heat control section for controlling an amount of gas output from a low-heat gas output end of the at least one gas output end of the gas controller to a low-heat gas nozzle of the at least one gas nozzle, and a high-heat control section for controlling an amount of gas output from a high-heat gas output end of the at least one gas output end of the gas controller to a high-heat gas nozzle of the at least one gas nozzle.

4. The all-purpose gas stove structure of claim 1, wherein the gas controller has a safety control valve for receiving a heat level signal from a heat sensor provided near the at least one gas nozzle and for cutting off gas output from the at least one gas output end when the heat level signal is lower than a control value.

5. The all-purpose gas stove structure of claim 1, wherein the opening-covering case body is further provided with an automatic ignition switch for controlling an automatic igniter in the opening-covering case body in order for an electronic ignition element provided at the at least one gas nozzle to carry out ignition at the at least one gas nozzle.

\* \* \* \* \*